United States Patent
Reykowski et al.

(10) Patent No.: US 7,782,908 B2
(45) Date of Patent: Aug. 24, 2010

(54) METHOD AND A FEED CIRCUIT FOR FEEDING A STREAM OF DIGITAL TRANSMISSION DATA INTO A TRANSMISSION MEDIUM HAVING FREQUENCY SUPPRESSION

(75) Inventors: Ame Reykowski, Gainesville, FL (US); Markus Vester, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 800 days.

(21) Appl. No.: 11/710,709

(22) Filed: Feb. 26, 2007

(65) Prior Publication Data

US 2007/0217412 A1   Sep. 20, 2007

(30) Foreign Application Priority Data

Feb. 27, 2006   (DE) .................. 10 2006 009 041

(51) Int. Cl.
*H04J 3/12* (2006.01)
*H04J 3/00* (2006.01)
*H03K 5/159* (2006.01)
*H04N 7/12* (2006.01)

(52) U.S. Cl. .................. 370/527; 370/529; 375/232; 375/240.06

(58) Field of Classification Search .................. 370/203, 370/204, 205, 206, 208, 210, 211, 212, 213, 370/215; 375/260
See application file for complete search history.

(56) References Cited

U.S. PATENT DOCUMENTS 6,952,444 B1 * 10/2005 Segal et al. .................. 375/232
2002/0129315 A1 * 9/2002 Onvural et al. .............. 714/758
2007/0064788 A1 * 3/2007 Yonge, III .................... 375/239

FOREIGN PATENT DOCUMENTS

EP   1 239 595 A2   9/2002

* cited by examiner

*Primary Examiner*—Alpus H Hsu
*Assistant Examiner*—Jessica Clifton

(57) ABSTRACT

A feed circuit accepts a stream of digital payload data and inserts it at predetermined first positions into a stream of digital transmission data. The feed circuit generates supplementary digital data using the stream of digital payload data and inserts it at predetermined second positions into a stream of digital transmission data. The feed circuit feeds the digital transmission data into a transmission medium. Said circuit determines the supplementary digital data in such a way that at least one frequency's portion of a frequency spectrum of the stream of digital transmission data will be minimized.

12 Claims, 3 Drawing Sheets

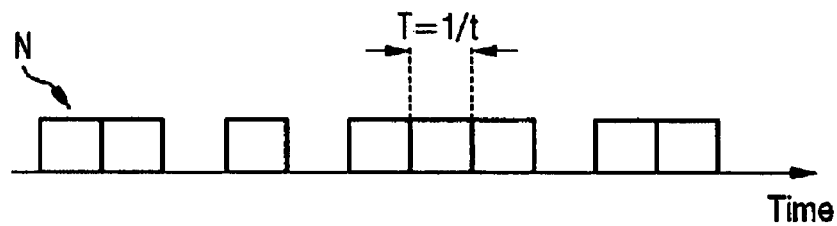
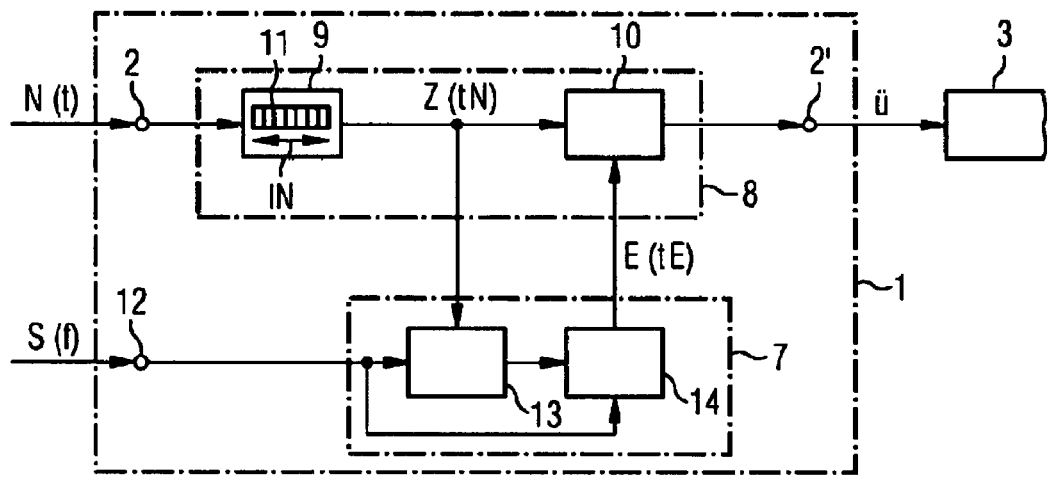
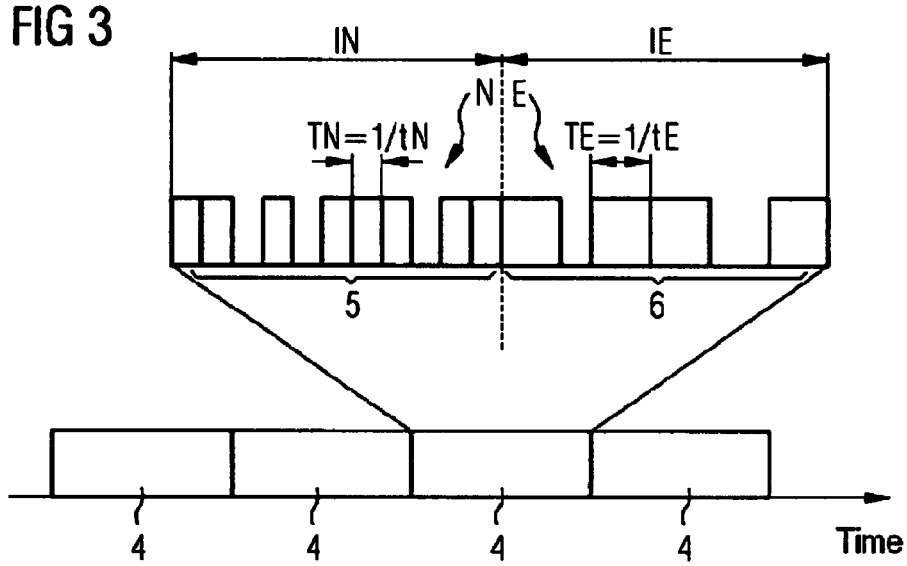

f f

METHOD AND A FEED CIRCUIT FOR FEEDING A STREAM OF DIGITAL TRANSMISSION DATA INTO A TRANSMISSION MEDIUM HAVING FREQUENCY SUPPRESSION

CROSS REFERENCE TO RELATED APPLICATIONS

This application claims priority of German application No. 10 2006 009 041.1 filed Feb. 27, 2006, which is incorporated by reference herein in its entirety.

FIELD OF THE INVENTION

The present invention relates to a method for feeding a stream of digital transmission data into a transmission medium. It relates further to a feed circuit corresponding thereto.

BACKGROUND OF THE INVENTION

In the prior art a feed circuit accepts a stream of digital payload data and inserts it at predetermined first positions into a stream of digital transmission data. In many cases the feed circuit feeds the thus obtained stream of digital transmission data directly into a transmission medium. The payload data will in that case be identical to the transmission data.

It is also already known that the feed circuit generates supplementary digital data using the stream of digital payload data, inserts said supplementary digital data, in addition to the digital payload data, at predetermined second positions into the stream of digital transmission data, and feeds the thus obtained stream of digital transmission data into the transmission medium. The stream of digital transmission data will in that case contain the payload data and the supplementary data. Typical processes are the generation of check information, for example parity bits, CRC (CRC=Cyclic Redundancy Check) information, and similar content. On the basis of the check information it is possible on the receiver side to detect and possibly even correct errors occurring during data transmission.

The transmission data is as a rule transmitted in the form of electric signals. In the case of line-based transmission the transmission medium corresponds to the transmission line; in the case of line-free transmission the transmission medium corresponds to an air link. Regardless of how the transmission medium is specifically embodied, transmitting of the transmission data may, though, have a disruptive influence on other equipment. For example other signals—in particular weak analog signals—can be disrupted. Magnetic resonance signals can be cited as an instance of weak, interference-sensitive signals of said type, but other situations are also conceivable in which transmitting of the digital transmission data can result in interference.

The interference is often especially critical when occurring at a specific frequency. In magnetic resonance systems it is, for example, particularly disruptive if the transmission data's spectrum includes components whose frequency corresponds to the Larmor frequency or another operating frequency of the magnetic resonance system or, as the case may be, is close thereto.

To avoid interference it is known how to shield the feed circuit, a corresponding feed-out circuit, and—in the case of line-based data transmission—the transmission medium. However, shielding of said type entails a substantial material outlay. It is further known how to locate potential sources of interference (which is to say the feed circuit, the feed-out circuit and, where applicable, the transmission medium) as far as possible from the elements that may be adversely affected. However, a solution of said type is awkward and not always practicable.

SUMMARY OF THE INVENTION

The object of the present invention is to provide a possibility for in a simple manner reducing, and as far as possible even avoiding, a disruptive influence of the data transmission on other components.

Said object is achieved for the method for feeding by the feed circuit's determining the supplementary digital data in such a way that at least one frequency's portion of a frequency spectrum of the stream of digital transmission data will be minimized.

Analogously thereto, the object is achieved for the feed circuit through the feed circuit's having a supplementary data generator embodied in such a way that supplementary digital data can be determined by it such that at least one frequency's portion of a frequency spectrum of the stream of digital transmission data will be minimized.

The feed circuit preferably feeds in each case groups of transmission data into the transmission medium, with each group of transmission data having two intrinsically coherent blocks of transmission data, with said blocks having block lengths, and with in each case one of said blocks containing exclusively payload data or, as the case may be, exclusively supplementary data. That is because the supplementary data will then be particularly simple to determine.

The block containing the payload data can have a block length of one bit or alternatively a block length greater than one bit. The same applies to the block containing the supplementary data. The block lengths of the two blocks can among themselves be the same or different.

The feed circuit preferably feeds the payload data at a payload data readout clock rate and the supplementary data at a supplementary data readout clock rate into the transmission medium. The payload data readout clock rate and the supplementary data readout clock rate can be the same or different.

The block lengths and the readout clock rates have preferably been determined in such a way as to produce the relationship $lN \cdot TN + lE \cdot TE = lN \cdot T,$ where
lN is the length of the block containing the payload data,
TN is the time for feeding a single item of payload data into the transmission medium,
lE is the length of the block containing the supplementary data,
TE is the time for feeding a single item of supplementary data into the transmission medium, and
T is the time for accepting a single item of payload data into the feed circuit.

The feed circuit preferably also accepts a time-dependent signal that is periodic with the frequency of the frequency component requiring to be reduced so that a phase angle of the signal can be ascertained using the signal. That is because it will in that case be possible for the feed circuit to ascertain the supplementary data using the time-dependent signal.

For correctly ascertaining the supplementary data it is advantageous for the feed circuit first to insert the payload data into the stream of digital transmission data and in that way ascertain a stream of intermediate digital data, then to ascertain the at least one frequency's portion of a frequency spectrum of the intermediate digital data, and finally to determine the supplementary data using the at least one frequency's portion of the frequency spectrum of the stream of intermediate digital data.

It will be particularly simple to determine the at least one frequency's portion of the frequency spectrum of the stream of intermediate digital data if the feed circuit weights the stream of intermediate digital data with a sinusoidal signal and with a cosinusoidal signal of the at least one frequency, integrates the weighted signals, and determines the supplementary data using the integrated signals.

The feed circuit's physical implementation will be particularly simple if it has a buffer memory for buffering a block of payload data, with its being possible for the payload data fed in via the input to be stored to the buffer memory at the payload data feed clock rate.

The feed circuit preferably has a frequency input via which a time-dependent signal periodic with the at least one frequency of the frequency component requiring to be reduced can be fed to the feed circuit. The supplementary data generator is in that case connected to the frequency input. That embodiment has the advantage that the frequency whose portion of the frequency spectrum is to be minimized can be fed to the feed circuit as a parameter.

A partial stream generator that is connected to the data input and inserts the payload data fed to it into the stream of digital transmission data and in that way ascertains a stream of intermediate digital data is preferably located upstream of the supplementary data generator. The supplementary data generator for its part preferably has a portion ascertaining means to which the stream of intermediate digital data can be fed. The at least one frequency's portion of a frequency spectrum of the intermediate digital data can be ascertained by means of the portion ascertaining means. The supplementary data generator preferably also has a supplementary data ascertaining means that ascertains the supplementary data using the proportion ascertained by the portion ascertaining means and inserts said data into the stream of digital transmission data.

The portion ascertaining means will be particularly simple in structure if it has multiplier blocks for multiplying the stream of intermediate digital data with a sinusoidal signal and with a cosinusoidal signal of the at least one frequency as well as integrator blocks located downstream of the multiplier blocks.

BRIEF DESCRIPTION OF THE DRAWINGS

Further advantages and specifics will emerge from the following description of exemplary embodiments in conjunction with the schematic drawings, in which:

FIG. 1 shows a block of digital payload data,
FIG. 2 is a block diagram of a feed circuit,
FIG. 3 shows a group of digital transmission data.

DETAILED DESCRIPTION OF THE INVENTION

Figure 4:
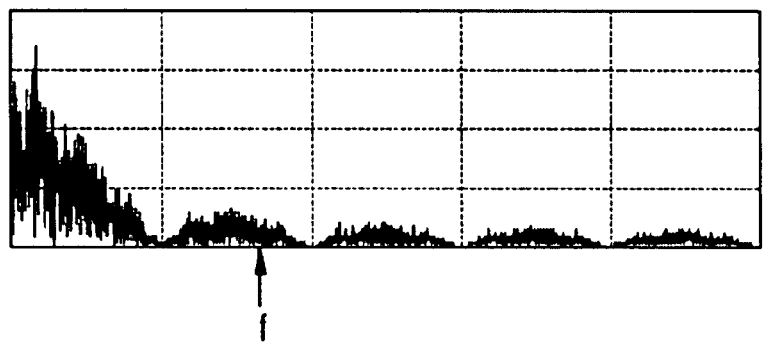
FIG. 4 shows a frequency spectrum.

According to FIG. 1, a stream of digital payload data N has a sequence (basically any sequence) of payload data N. Each single item of payload data N is a bit, so in logic terms has either the value zero or the value one. The payload data N is according to FIG. 2 fed to a feed circuit 1 at a payload data feed clock rate t.

Feeding takes place bit-serially. For feeding a single item of payload data N, a payload data feed time T is therefore required whose reciprocal value corresponds to the payload data feed clock rate t.

According to FIG. 2, the payload data N fed to it is accepted by the feed circuit 1 via a data input 2. The feed circuit 1 feeds a stream of digital transmission data Ü into a transmission medium 3 via a data output 2'. The transmission data Ü is also fed into the transmission medium 3 bit-serially. The transmission data Ü contains on the one hand the digital payload data N and on the other hand supplementary digital data E.

The transmission medium 3 can be any transmission medium 3. Examples of possible transmission media 3 are a twisted two-wire line, a coaxial cable, and an air link.

According to FIG. 3, the feed circuit 1 feeds groups 4 of transmission data U into the transmission medium 3. The groups 4 are of identical structure among themselves. Each group 4 consists of a payload data block 5 and a supplementary data block 6. The blocks 5, 6 are in each case intrinsically coherent. The payload data block 5 contains exclusively payload data N, the supplementary data block 6 contains exclusively supplementary data E. The payload data block 5 has a payload data block length lN, the supplementary data block 6 has a supplementary data block length lE. The block lengths lN, lE indicate the number of bits N, E contained in the blocks 5, 6.

The feed circuit 1 according to FIG. 3 feeds the transmission data Ü corresponding to the payload data N into the transmission medium 3 at a payload data readout clock rate tN. A payload data readout time TN whose reciprocal value equals the payload data readout clock rate tN is thus required for feeding in a single item of payload data N. The feed circuit 1 feeds the transmission data Ü corresponding to the supplementary data E into the transmission medium 3 at a supplementary data readout clock rate tE. A supplementary data readout time TE whose reciprocal value equals the supplementary data readout clock rate tE is thus required for feeding in a single item of supplementary data E.

According to FIG. 3, the readout clock rates TN, TE are different from each other. However, they could also have the same value.

It can further be seen from FIG. 3 that the block lengths lN, lE are both greater than one but are different from each other. However, they could also have the same value. It would furthermore also be possible for one of the block lengths lN, lE (it does not matter which) or for both block lengths lN, lE to have the value one.

The block lengths lN, lE and the readout clock rates tN, tE have preferably been determined in such a way as to produce the relationship $$lN \cdot TN + lE \cdot TE = lN \cdot T.$$

That is because the mean data rate at which the feed circuit 1 feeds the payload data N into the transmission medium 3 will then be identical to the transmission rate at which the payload data N is fed to the feed circuit 1. Otherwise possibly required buffering of payload data N will hence either not be necessary or, if it is, then only to a very small extent.

The payload data N is fed to the feed circuit 1, as already mentioned, via the data input 2. The supplementary data E, by contrast, is generated by the feed circuit 1 itself, specifically using the stream of digital payload data N. The supplementary data E is generated by means of a supplementary data generator 7 forming a constituent part of the feed circuit 1.

The feed circuit 1 furthermore has an insertion circuit 8. The digital payload data N can be inserted at predetermined first positions 5 (namely in the area of the payload data blocks 5) into the stream of digital transmission data Ü by means of the insertion circuit 8. The payload data N is inserted by means of a partial stream generator 9 that forms a constituent part of the insertion circuit 8 and is located upstream of the supplementary data generator 7. The partial stream generator 9 is connected to the data input 2.

The supplementary digital data E can furthermore be inserted at predetermined second positions 6 (namely in the area of the supplementary data blocks 6) into the stream of digital transmission data Ü by means of the insertion circuit 8. The supplementary data E is inserted by means of a summation element 10 of the insertion circuit 8.

The digital transmission data Ü can also be fed into the transmission medium 3 by means of the insertion circuit 8. The insertion circuit 8 is therefore connected to the data output 2'.

According to FIG. 3, the partial stream generator 9 has a buffer memory 11 in which a block of payload data N can be buffered. The payload data N is fed bit-serially into the buffer memory 11 via the data input 2 at the payload data feed clock rate t. When a block of payload data N having the payload data block length lN has been stored in the buffer memory 11, the block will be read out of the buffer memory 11 bit-serially. Said block will be fed into the transmission medium 3 via the summation element 10 and the data output 2'. The payload data is read out and fed in at the payload data readout clock rate tN. The payload data N is thus ultimately time-compressed by means of the buffer memory 11. That causes the feed circuit 1 to insert the digital payload data N into the stream of digital transmission data Ü at the predetermined first positions 5.

The time-compressed payload data N read out of the buffer memory 11—which is to say the stream of digital transmission data Ü into which the payload data N has already been inserted but not yet the supplementary data E—forms a stream of intermediate digital data Z. The stream of intermediate digital data Z is fed not only to the summation element 10 but also to the supplementary data generator 7. The supplementary data generator 7 generates the supplementary digital data E using the stream of intermediate digital data Z. The supplementary data generator 7 feeds out the supplementary digital data E bit-serially to the summation element 10 in the form of the supplementary data block 6 and thus feeds it into the transmission medium 3. The supplementary data E is fed out in such a way that the supplementary digital data E will be inserted into the stream of digital transmission data Ü at the predetermined second positions 6. The supplementary data E is fed out at the supplementary data readout clock rate tE.

Figure 5:
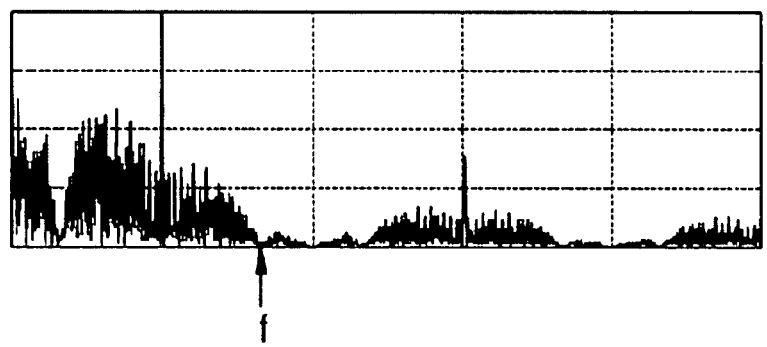
FIG. 5 shows a further frequency spectrum.

According to FIG. 4, the stream of intermediate digital data Z has a frequency spectrum whose components extend across many frequencies. According to FIG. 5, the stream of digital transmission data Ü also has a frequency spectrum whose components extend across many frequencies. However, the portion of at least one frequency f has in the case of that frequency spectrum been minimized. Said frequency f will therefore be referred to below as the suppression frequency. The supplementary data generator 7 is thus embodied in such a way that the supplementary digital data E will be determined thereby such that the portion of the suppression frequency f of the frequency spectrum of the stream of digital transmission data Ü will be minimized.

Figure 6:
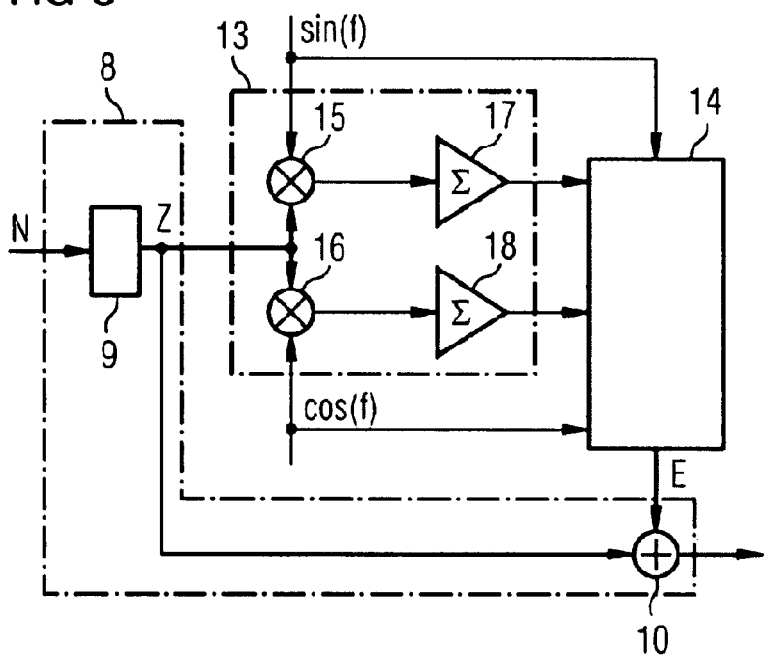
FIG. 6 is a block diagram of a supplementary data generator.

It will now be explained in conjunction with FIG. 2 and FIG. 6 how suppressing of the portion of the suppression frequency f can be achieved.

According to FIG. 2, the feed circuit 1 has a frequency input 12 via which a time-dependent signal S can be fed to the feed circuit 1. The time-dependent signal S is periodic with the suppression frequency f. It can be, for example, a sinusoidal or cosinusoidal signal. It is also possible for both a sinusoidal signal and a cosinusoidal signal to be fed to the feed circuit 1. A phase angle as such can also be fed to the feed circuit 1. It should, though, be possible in any event to ascertain the phase angle using the signal S.

The time-dependent signal S is fed to the supplementary data generator 7, which is for that purpose connected to the frequency input 12. The supplementary data generator 7 further has a portion ascertaining means 13. The time-dependent signal S and the stream of intermediate digital data Z fed out by the partial stream generator 9 are fed to the portion ascertaining means 13. Using the time-dependent signal S and the stream of intermediate digital data Z fed to it, the portion ascertaining means 13 ascertains the portion of the suppression frequency f of the frequency spectrum of the stream of intermediate digital data Z fed to it. The portion ascertaining means 13 feeds said portion to a supplementary data ascertaining means 14. The supplementary data ascertaining means 14 ascertains the supplementary data E using the portion ascertained by the portion ascertaining means 13. The supplementary data ascertaining means 14 further feeds the supplementary data E into the transmission medium 3 through correctly timed feeding-out via the summation element 10. The supplementary circuit 1 thus ultimately ascertains the supplementary data E using the portion of the suppression frequency f of the frequency spectrum of the stream of intermediate digital data Z.

The portion of the suppression frequency f of the spectrum can be ascertained in different ways. According to FIG. 6, it is done most simply if the portion ascertaining means 13 has multiplier blocks 15, 16. On the one hand, the stream of intermediate digital data Z fed out by the partial stream generator 9, and on the other hand a sinusoidal or, as the case may be, cosinusoidal signal that is periodic with the suppression frequency f will in that case be fed to the multiplier blocks 15, 16. The stream of intermediate digital data Z fed to the multiplier blocks 15, 16 is weighted there with the sinusoidal signal or, as the case may be, cosinusoidal signal.

Integrator blocks 17, 18 are located downstream of the multiplier blocks 15, 16. The integrator blocks 17, 18 integrate the signals weighted with the sinusoidal signal or, as the case may be, cosinusoidal signal and feed their integration result to the supplementary data ascertaining means 14. Said means determines the supplementary data E using the integrated signals.

The portion of the suppression frequency f of the frequency spectrum of the stream of digital transmission data Ü can be very effectively minimized by means of the above-described procedure. FIGS. 7 to 10 show some possible embodiments thereof.

Figure 7:
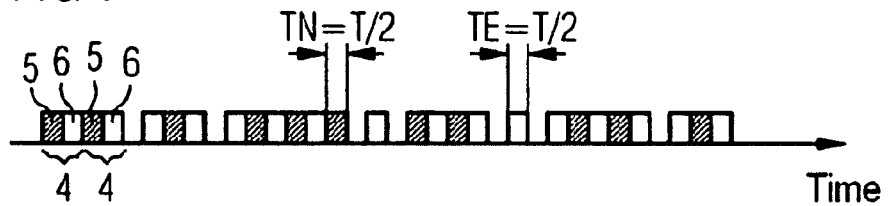
FIGS. 7 to 10 show groups of digital transmission data.

According to FIG. 7, both block lengths lN, lE have the value one. The readout clock rates tN, tE are the same. The buffer memory 11 is not required in the case of this embodiment.

Figure 8:
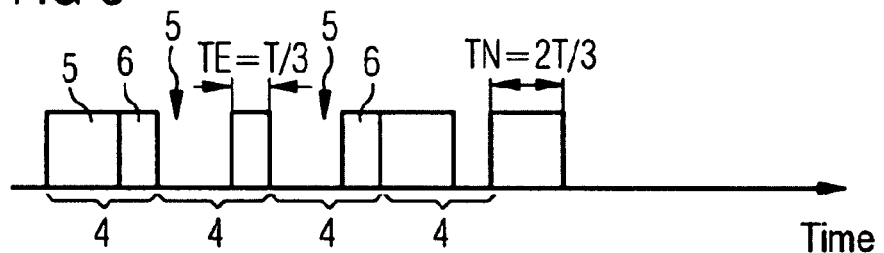

FIG. 8 shows basically the same embodiment as FIG. 7, but here the readout clock rates tN, tE are not the same. The buffer memory 11 is not required in the case of this embodiment.

Figure 9:
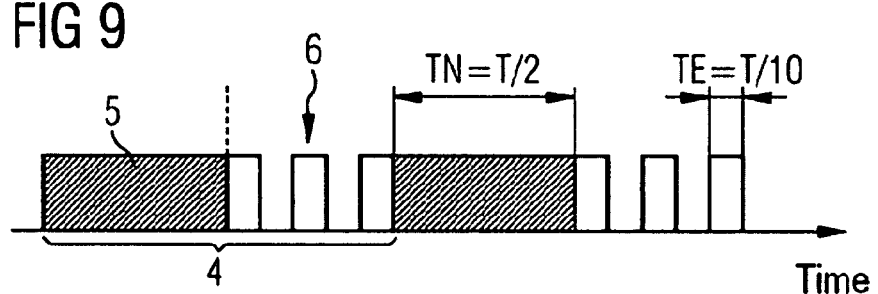

In the embodiment according to FIG. 9, the payload data block length lN is five and the supplementary data block length lE has the value one. The readout clock rates tN, tE are not the same. They could, though, also be the same. The buffer memory 11 is not required in the case of this embodiment.

Figure 10:
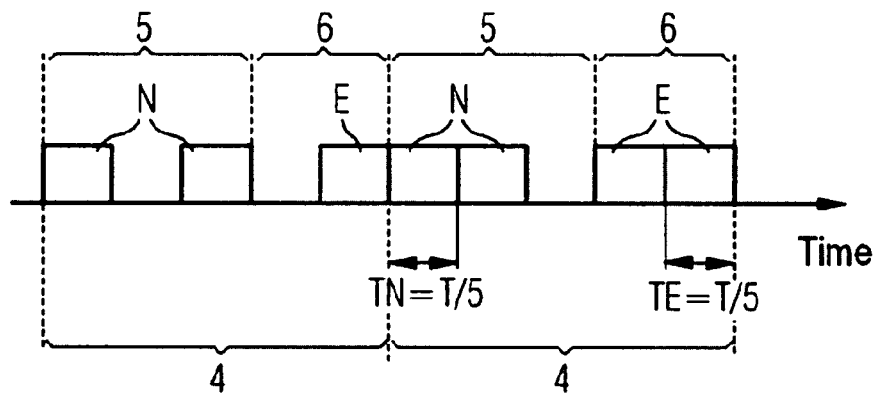

In the embodiment according to FIG. 10, the payload data block length lN has the value three and the supplementary data block length lE the value two. The readout clock rates tN, tE are, according to FIG. 10, the same. They could, though, also be different.

The above examples shown in FIGS. 7 to 10 can basically be modified in any way. The block lengths lN, lE and the readout clock rates tN, tE can therefore also have other values.

As alternative options the present invention can furthermore be realized by means of physical circuitry or by program means.

The invention claimed is:

1. A method for feeding a stream of digital transmission data into a transmission medium, comprising:
   accepting a digital payload data;
   inserting the digital payload data into the stream of digital transmission data at a predetermined first position;
   generating a supplementary digital data using the digital payload data by the feed circuit so that at least one frequency portion in a frequency spectrum of the stream of digital transmission data is minimized;
   inserting the supplementary digital data into the stream of digital transmission data at a predetermined second position; and
   feeding the stream of digital transmission data into the transmission medium,
   wherein the stream of digital transmission data comprises a plurality of groups of transmission data,
   wherein each group of transmission data comprises two intrinsically coherent blocks of transmission data,
   wherein the two blocks have block lengths,
   wherein one of the blocks comprises exclusively the payload data or exclusively the supplementary data,
   wherein the block lengths are one bit or greater than one bit,
   wherein the block lengths are identical or different,
   wherein the payload data is fed into the transmission medium at a payload data readout clock rate and the supplementary data is fed into the transmission medium at a supplementary data readout clock rate,
   wherein the payload data readout clock rate and the supplementary data readout clock rate are identical or different, and
   wherein the block lengths and the payload data readout clock readout clock rate and the supplementary data readout clock rate are determined based on a relationship $lN \cdot TN + lE \cdot TE = lN \cdot T,$ wherein
   lN is a block length of the block comprising the payload data,
   TN is a time for feeding a single item of the payload data into the transmission medium,
   lE is a block length of the block comprising the supplementary data,
   TE is a time for feeding a single item of the supplementary data into the transmission medium, and
   T is a time for accepting a single item of the payload data into the feed circuit.

2. The method as claimed in claim 1, further comprising accepting a time dependent signal, wherein the time dependent signal is periodic and comprises the at least one frequency portion in the frequency spectrum of the stream of digital transmission data that requires to be minimized so that a phase angle of the signal is ascertained.

3. The method as claimed in claim 2,
   wherein an intermediate digital data is generated by inserting the payload data into the stream of digital transmission data at the predetermined first position,
   wherein the at least one frequency portion in a frequency spectrum of the intermediate digital data is determined based on the intermediate digital data and the time dependent signal, and
   wherein the supplementary data is ascertained based on the at least one frequency portion in the frequency spectrum of the intermediate digital data.

4. The method as claimed in claim 3,
   wherein the time dependent signal comprises a sinusoidal signal or a cosinusoidal signal,
   wherein the intermediate digital data is weighted with the sinusoidal signal or the cosinusoidal signal,
   wherein the weighted signal is integrated, and
   wherein the supplementary data is ascertained using the integrated signal.

5. A feed circuit for feeding a stream of digital transmission data into a transmission medium, comprising:
   a data input that feeds a digital payload data into the feed circuit;
   a supplementary data generator that generates a supplementary digital data using the digital payload data so that at least one frequency portion in a frequency spectrum of the stream of digital transmission data is minimized;
   an insertion circuit connected to the data input and the supplementary data generator that inserts the digital payload data at a predetermined first position and the supplementary digital data at a predetermined second position into the stream of the digital transmission data; and
   a data output connected to the insertion circuit that feeds the stream of the digital transmission data into the transmission medium,
   wherein the payload data is fed into the transmission medium as a block of the payload data at a payload data readout clock rate,
   wherein the supplementary data is fed into the transmission medium as a block of the supplementary data at a supplementary data readout clock rate, and
   wherein the blocks have block lengths, and
   wherein the block lengths and the payload data readout clock rate and the supplementary data readout clock rate are determined based on a relationship $lN \cdot TN + lE \cdot TE = lN \cdot T,$ wherein
   lN is a block length of the payload data block,
   TN is a time for feeding a single item of the payload data into the transmission medium,
   lE is a block length of the supplementary data block,
   TE is a time for feeding a single item of the supplementary data into the transmission medium, and
   T is a time for feeding a single item of the payload data into the feed circuit.

6. The feed circuit as claimed in claim 5, further comprising a buffer memory that buffers the block of the payload data and stores the payload data at a payload data feed clock rate.

7. The feed circuit as claimed in claim 5, further comprising a frequency input connected to the supplementary data generator that inputs a periodic time dependent signal comprising the at least one frequency portion in the frequency spectrum of the stream of digital transmission data that requires to be minimized.

8. The feed circuit as claimed in claim 7,
wherein the feed circuit comprises a partial stream generator that is located upstream of the supplementary data generator and is connected to the data input,
wherein the partial stream generator generates an intermediate digital data by inserting the payload data into the stream of digital transmission data at the predetermined first position,
wherein the intermediate digital data is fed into the supplementary data generator,
wherein the supplementary data generator ascertains the at least one frequency portion in a frequency spectrum of the intermediate digital data based on the periodic time dependent signal and the intermediate digital data, and
wherein the supplementary data generator generates the supplementary data based on the at least one frequency portion in the frequency spectrum of the intermediate digital data and feeds the supplementary data into the insertion circuit.

9. The feed circuit as claimed in claim 8,
wherein the supplementary data generator comprises a multiplier block and an integrator block located downstream of the multiplier block,
wherein the multiplier block multiplies the intermediate digital data with the periodic time dependent signal comprising a sinusoidal signal or a cosinusoidal signal, and wherein the integrator block integrates the multiplied intermediate digital data.

10. The feed circuit as claimed in claim 5, wherein the block lengths are one bit or greater than one bit.

11. The feed circuit as claimed in claim 10, wherein the block lengths are identical or different.

12. The feed circuit as claimed in claim 5, wherein the payload data readout clock rate and the supplementary data readout clock rate are identical or different.

* * * * *